US008808870B2

(12) United States Patent
Zheng et al.

(10) Patent No.: US 8,808,870 B2
(45) Date of Patent: Aug. 19, 2014

(54) FUNCTIONALLY GRADED COATING

(75) Inventors: Qingjun Zheng, Export, PA (US);
Piyamanee Komolwit, Greensburg, PA (US); Yixiong Liu, Greensburg, PA (US); Jim Faust, New Albany, IN (US); Jonathan Bitler, Fayetteville, AR (US); Srinivasarao Boddapati, New Albany, IN (US)

(73) Assignee: Kennametal Inc., Latrobe, PA (US)

( * ) Notice: Subject to any disclaimer, the term of this patent is extended or adjusted under 35 U.S.C. 154(b) by 116 days.

(21) Appl. No.: 13/305,448

(22) Filed: Nov. 28, 2011

(65) Prior Publication Data
US 2013/0136941 A1 May 30, 2013

(51) Int. Cl.
B32B 15/04 (2006.01)
B32B 7/02 (2006.01)
C23C 24/08 (2006.01)
C23C 24/00 (2006.01)

(52) U.S. Cl.
CPC . B32B 15/04 (2013.01); B32B 7/02 (2013.01); C23C 24/08 (2013.01); C23C 24/00 (2013.01)
USPC ........... 428/550; 428/615; 428/548; 428/564; 428/614

(58) Field of Classification Search
CPC ............................... B32B 15/04; C23C 24/00
USPC ................................................. 428/550, 615
See application file for complete search history.

(56) References Cited

U.S. PATENT DOCUMENTS

| 3,005,795 | A | 10/1961 | Busse et al. |
| 3,024,128 | A | 3/1962 | Dawson |
| 3,281,511 | A | 10/1966 | Goldsmith |
| 3,533,930 | A | 10/1970 | Lawton et al. |
| 3,541,070 | A | 11/1970 | Ahrabi |
| 3,556,161 | A | 1/1971 | Roberts |
| 3,677,853 | A | 7/1972 | Anzelone, Jr. et al. |
| 3,743,556 | A | 7/1973 | Breton et al. |
| 3,778,586 | A | 12/1973 | Breton et al. |
| 3,838,092 | A | 9/1974 | Vogt et al. |
| 3,853,690 | A | 12/1974 | McGarry et al. |
| 3,864,124 | A | 2/1975 | Breton et al. |
| 3,916,506 | A | 11/1975 | Wolf |
| 3,988,405 | A | 10/1976 | Smith et al. |
| 4,000,781 | A | 1/1977 | Knapp |
| 4,102,399 | A | 7/1978 | Harnsberger |
| 4,194,040 | A | 3/1980 | Breton et al. |
| 4,242,842 | A | 1/1981 | Yancey |
| 4,478,871 | A | 10/1984 | Sakaguchi et al. |
| 4,544,377 | A | 10/1985 | Schwen |

(Continued)

OTHER PUBLICATIONS

Sagues, A.A.; Sargent, G.A.; Spencer, D.K.; "Slurry Abrasion/Erosion Behavior of Metal-Ceramic Coatings," Mechanical Properties, Performance, and Failure Modes of Coatings, 1984, Cambridge University Press: Ed. Shives, T.R. and Peterson, M.B.; p. 165.*

Primary Examiner — Mark Ruthkosky
Assistant Examiner — Julia L Rummel
(74) Attorney, Agent, or Firm — Matthew W. Gordon, Esq.

(57) ABSTRACT

In one aspect, composite articles are described comprising multifunctional coatings. A composite article described herein, in some embodiments, comprises a substrate and a coating adhered to the substrate, the coating comprising an inner layer and an outer layer, the inner layer comprising a presintered metal or alloy and the outer layer comprising particles disposed in a metal or alloy matrix.

23 Claims, 10 Drawing Sheets

(56) References Cited

U.S. PATENT DOCUMENTS

| | | | | |
|---|---|---|---|---|
| 4,884,477 A | | 12/1989 | Smith et al. | |
| 4,919,013 A | | 4/1990 | Smith et al. | |
| 4,939,101 A | | 7/1990 | Black et al. | |
| 4,966,748 A | | 10/1990 | Miyasaka et al. | |
| 5,147,460 A | | 9/1992 | Otaki | |
| 5,161,728 A | | 11/1992 | Li | |
| 5,164,247 A | | 11/1992 | Solanki et al. | |
| 5,236,116 A | | 8/1993 | Solanki et al. | |
| 5,238,881 A | | 8/1993 | Norris | |
| 5,271,547 A | | 12/1993 | Carlson | |
| 5,310,605 A | * | 5/1994 | Baldoni et al. | 428/569 |
| 5,352,526 A | * | 10/1994 | Solanki et al. | 428/422 |
| 5,492,550 A | | 2/1996 | Krishnan et al. | |
| 5,641,921 A | | 6/1997 | Dennis et al. | |
| 5,660,320 A | | 8/1997 | Hoffmuller et al. | |
| 5,868,819 A | | 2/1999 | Guhde et al. | |
| 6,073,518 A | | 6/2000 | Chow et al. | |
| 6,171,709 B1 | | 1/2001 | Koizumi et al. | |
| 6,649,682 B1 | * | 11/2003 | Breton et al. | 524/404 |
| 7,250,123 B2 | | 7/2007 | Fujioka et al. | |
| 7,968,218 B2 | | 6/2011 | Pitonak et al. | |
| 2007/0224349 A1 | | 9/2007 | Hosenfeldt et al. | |

* cited by examiner

FUNCTIONALLY GRADED COATING

FIELD

The present invention relates to coatings and, in particular, to multifunctional coatings for metallic substrates.

BACKGROUND

Coatings are often applied to equipment subjected to harsh environments or operating conditions in efforts to extend the useful lifetime of the equipment. Various coating identities and constructions are available depending on the mode of failure to be inhibited. For example, wear resistant, erosion resistant and corrosion resistant coatings have been developed for metallic substrates.

A significant problem encountered in coating applications is premature failure or degradation of the coating. Coatings of metallic substrates can fail according to a variety of mechanisms, including delamination and cracking/fracture. In some cases, a coated metal substrate is subjected to thermal cycling that can impair the bonding of the coating to the substrate. In some applications, for example, the metal substrate is subjected to a post-coat heat treatment such as martempering or normalizing in order to improve the mechanical properties of the substrate, wherein the post-coat heat treatment fractures the coating. Moreover, in some cases, cracks in the coating can propagate into the substrate leading to additional problems. FIG. 1 illustrates fracture of an abrasion resistant prior art coating bonded to a metal substrate, the fracture resulting from coating processes and/or heat treatment of the substrate. As illustrated in FIG. 1, the crack traversed the abrasion resistant coating.

Attempts have been made to provide coating architectures that are resistant to premature failure resulting from heat treatment, cladding processes and other environmental factors. In U.S. Pat. No. 5,352,526, for example, a composite coating is provided having a soft metallic layer under a hardface coating, the soft metallic layer having a crack arrest functionality. The composite coating of U.S. Pat. No. 5,352,526 is formed by stacking preform layers on the metal substrate surface and heating the preform layers in a single step to provide the composite coating. A preform comprising particles of the soft metallic underlayer is applied to the substrate followed by application of a preform of refractory particles, such as tungsten carbide. A braze filler preform is applied to the refractory particle preform and all three preforms are heated simultaneously to provide the coating. The braze filler material top layer is infused by capillary action into both the porous refractory particle layer and the porous soft metal particle layer yielding an essentially void free coating. While demonstrating sufficient crack arrest properties, the soft layer permitted crack propagation beyond the interface with the hard particle layer, thereby compromising the mechanical and corrosion resistant properties of the soft layer.

SUMMARY

In one aspect, composite articles are described herein comprising multifunctional coatings. In some embodiments, multifunctional coatings of composite articles described herein are operable to increase the abrasion/wear resistance and corrosion resistance of the articles while inhibiting coating failure modes, including delamination and/or fracture.

A composite article described herein, in some embodiments, comprises a substrate and a coating adhered to the substrate, the coating comprising an inner layer and an outer layer, the inner layer comprising a metal or alloy layer having porosity less than 40% by volume and the outer layer comprising particles disposed in a metal or alloy matrix.

In another embodiment, a composite article described herein comprises a substrate and a coating adhered to the substrate, the coating comprising an inner layer and an outer layer, the inner layer comprising a presintered metal or alloy and the outer layer comprising particles disposed in a metal or alloy matrix. In some embodiments, the presintered metal or alloy inner layer is fully dense or substantially fully dense. Alternatively, in some embodiments, the presintered metal or alloy inner layer has porosity penetrated by the metal or alloy matrix of the outer layer.

In another embodiment, a composite article described herein comprises a substrate and a coating adhered to the substrate, the coating comprising an inner layer, an outer layer and an interfacial transition region between the inner layer and the outer layer, wherein the inner layer comprises a substantially fully dense metal or alloy and the outer layer comprises particles disposed in a metal or alloy matrix. In some embodiments, the interfacial transition region demonstrates a structure different from the inner layer and the outer layer.

In some embodiments of composite articles described herein, the substrate comprises a metal or alloy. Moreover, in some embodiments, coatings described herein are metallurgically bonded to the metal or alloy substrate.

In another aspect, methods of making composite articles are described herein. In some embodiments, a method of making a composite article comprises disposing over a surface of a substrate a sheet comprising a powder metal or powder alloy composition, heating the sheet to provide an inner layer comprising a sintered metal or sintered alloy adhered to the substrate. A particulate composition comprising hard particles in a carrier is disposed over the sintered metal or sintered alloy of the inner layer and a brazing alloy composition is disposed over the particulate composition. The particulate composition and the brazing alloy composition are heated to provide an outer layer comprising the hard particles disposed in an alloy matrix. In some embodiments, the outer layer is metallurgically adhered to the inner layer.

In some embodiments, the sheet comprising the powder metal or powder alloy composition is heated under conditions sufficient to provide a fully dense or substantially fully dense sintered metal or sintered alloy inner layer. Alternatively, the sheet comprising the powder metal or powder alloy composition, in some embodiments, is heated under conditions to yield a sintered metal or sintered alloy inner layer having porosity. In some embodiments wherein the sintered metal or sintered alloy inner layer displays porosity, the porosity is permeated with the alloy matrix of the outer layer to provide a fully dense or substantially fully dense inner layer.

Moreover, in some embodiments of methods described herein, the powder metal or powder alloy composition is disposed in a liquid carrier as opposed to a sheet and applied to a surface of the substrate. The powder metal or powder alloy composition is subsequently heated to provide an inner layer comprising the sintered metal or sintered alloy adhered to the substrate. The sintered metal or sintered alloy can be fully dense or can demonstrate porosity, depending on heating conditions. The particulate composition and brazing alloy composition can be subsequently applied over the sintered metal or sintered alloy inner layer and heated to provide an outer layer comprising the hard particles disposed in an alloy matrix.

Coatings of composite articles and methods described herein, in some embodiments, are multifunctional. In some embodiments, for example, a metal or alloy inner layer displays crack arrest and/or corrosion resistant functionalities. Additionally, the coating outer layer comprising particles disposed in a metal or alloy matrix, in some embodiments, is resistant to abrasion and/or erosion.

These and other embodiments are described in greater detail in the detailed description which follows.

DETAILED DESCRIPTION

Figure 1:
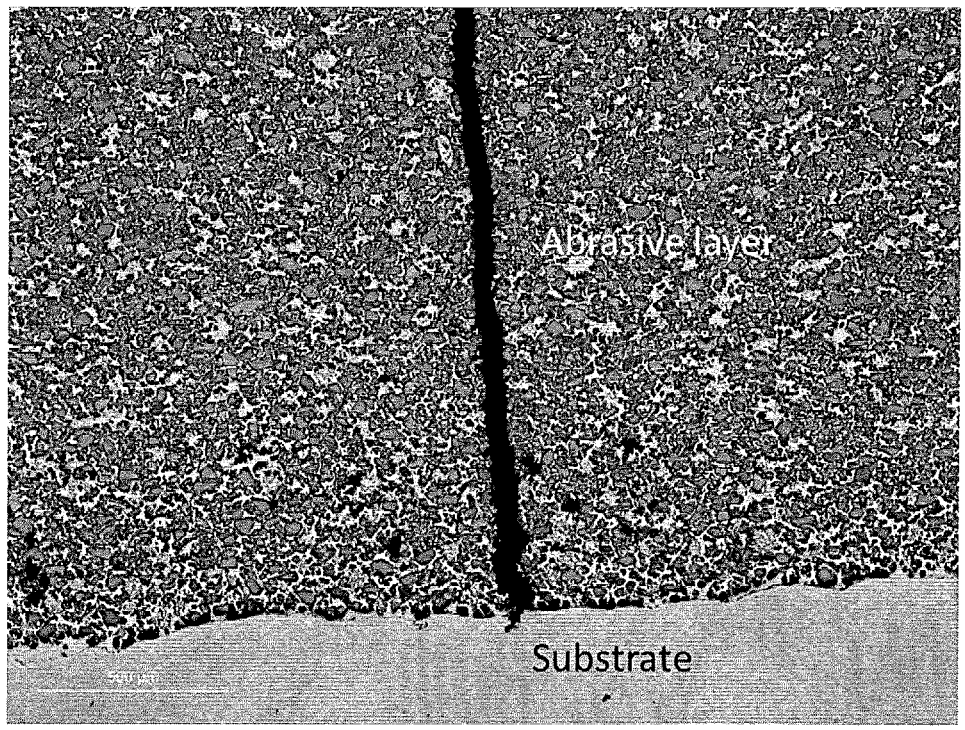
FIG. 1 illustrates a prior art abrasion resistant coating applied to a metal substrate, wherein the abrasion resistant coating has fractured from local stresses induced during coating processes and/or post-coat heat treatment of the metal substrate.

Embodiments described herein can be understood more readily by reference to the following detailed description and examples and their previous and following descriptions, Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In one aspect, composite articles are described herein comprising multifunctional coatings. In some embodiments, multifunctional coatings of composite articles described herein are operable to increase the abrasion/wear resistance and corrosion resistance of the articles while inhibiting coating failure modes, including delamination and/or fracture.

A composite article described herein, in some embodiments, comprises a substrate and a coating adhered to the substrate, the coating comprising an inner layer and an outer layer, the inner layer comprising a metal or alloy layer having porosity less than 40% by volume and the outer layer comprising particles disposed in a metal or alloy matrix. As described further herein, the metal or alloy of the inner layer, in some embodiments, comprises a presintered metal or alloy. Alternatively, in some embodiments, the metal or alloy comprises weld overlay, plasma transferred arc, thermal spray, cold spray or laser clad deposited metal or alloy. In some embodiments, for example, weld overlay includes rod weld overlay, wire weld overlay or powder weld overlay. In some embodiments, the metal or alloy of the inner layer is applied by infrared cladding or induction cladding.

In another embodiment, a composite article described herein comprises a substrate and a coating adhered to the substrate, the coating comprising an inner layer and an outer layer, the inner layer comprising a presintered metal or alloy and the outer layer comprising particles disposed in a metal or alloy matrix.

Turning now to components of composite articles described herein, a composite article described herein comprises a substrate. In some embodiments, a substrate comprises a metal or alloy. A substrate, for example, can comprise iron alloys, nickel alloys, cobalt alloys or other alloys. In some embodiments, substrates comprise cast iron, low-carbon steels, alloy steels, tool steels or stainless steels. In some embodiments, a substrate comprises a refractory material. Moreover, substrates can comprise various geometries. In some embodiments, a substrate has a cylindrical geometry, wherein the inner diameter (ID) surface, outer diameter (OD) surface or both are coated with a coating described herein. In some embodiments, for example, substrates comprise bearings, extruder barrels, extruder screws, flow control components, roller cone bits, fixed cutter bits, piping or tubes. In some embodiments, piping comprises boiler piping or piping/tubes subject to harsh environmental conditions, including high erosion conditions.

A composite article described herein comprises a coating adhered to the substrate, the coating, in some embodiments, having an inner layer comprising a presintered metal or alloy. In such embodiments, the metal or alloy of the inner layer is termed "presintered" since metal or alloy particles are sintered to provide the inner layer of the coating prior to application or formation of the outer layer of the coating. Sintering metal or alloy particles to provide a sintered metal or alloy inner layer adhered to the substrate prior to application of the coating outer layer is a fundamental structural departure from prior coatings wherein metal or alloy particles are infiltrated and/or encapsulated with a braze alloy in the simultaneous production of the inner and outer layers of the coating.

Suitable metals or alloys for the coating inner layer can be selected according to various considerations including, but not limited to, the compositional identity of the substrate, desired hardness of the inner layer and/or the desired compositional identity of the metal or alloy matrix of the outer layer.

In some embodiments, the inner layer comprises presintered nickel. The inner layer, in some embodiments, comprises a presintered nickel-based alloy. Nickel-based alloys for use in some embodiments of a coating inner layer contain additive elements of varying contents. Additive elements can include boron, aluminum, carbon, silicon, phosphorous, titanium, zirconium, yttrium, rare earth elements, vanadium, niobium, tantalum, chromium, molybdenum, tungsten, manganese, iron, cobalt, copper or silver or combinations thereof. In some embodiments, presintered nickel-based alloys suitable for an inner layer have compositional parameters derived from Table I:

TABLE I

Presintered Ni-Alloy Composition

| Element | Amount (wt. %) |
| --- | --- |
| Cobalt | 0-15 |
| Chromium | 1-30 |
| Molybdenum | 2-28 |
| Tungsten | 0-5 |
| Iron | 0-50 |
| Niobium | 0-6 |
| Silicon | 0-1 |
| Manganese | 0-2 |
| Copper | 0-3 |
| Aluminum | 0-1 |
| Titanium | 0-2 |
| Nickel | Balance |

In some embodiments, a presintered nickel-based alloy of an inner layer comprises a nickel-iron alloy, such as Ni-30Fe or a nickel-chromium alloy, such as Ni-20Cr or Ni-10Cr. Additionally, in some embodiments, a presintered nickel-based alloy comprises a nickel-copper alloy such as Ni-55Cu or Ni-30Cu. In one embodiment, a nickel-based alloy comprises Ni-2Mn-2Al-1Si. Nickel-based alloys, in some embodiments, are commercially available under the HASTELLOY®, INCONEL® and/or BALCO® trade designations.

A presintered alloy of an inner layer, in some embodiments, comprises copper-based alloys. Additive elements for copper-based alloys can include beryllium, aluminum, nickel, chromium, cobalt, manganese, iron, silicon, zinc, zirconium, lead, tungsten, titanium, tantalum, niobium, boron or phosphorous or combinations thereof. In some embodiments, a presintered copper-based alloy of an inner layer comprises Cu-45Ni, Cu-10Ni, Cu-(18-27)Ni-(18-27)Mn or Cu-(29-32)Ni-(1.7-2.3)Fe-(1.5-2.5)Mn.

In some embodiments, an inner layer comprises presintered cobalt or a presintered cobalt-based alloy. Additive elements for cobalt-based alloys can comprise chromium, molybdenum, tungsten, nickel, iron, boron, carbon, nitrogen, phosphorous, aluminum, silicon, manganese, titanium, vanadium, niobium, tantalum, zirconium, yttrium or copper or combinations thereof. In some embodiments, cobalt alloys are commercially available under the trade designation STELLITE® and/or MEGALLIUM®.

Moreover, in some embodiments, the inner layer comprises presintered stainless steel. In some embodiments, stainless steels of the inner layer comprise austenic stainless steels, including 300 series stainless steels (e.g. 304, 316, 317, 321, 347) and 600 series stainless steels (e.g., 630-635, 650-653, 660-665). In some embodiments, stainless steels of the inner layer comprise ferritic stainless steels, such as those containing 10-27% chromium with marginal nickel contents. Stainless steels of the inner layer, in some embodiments, comprise duplex stainless steels or specialty iron-based alloys, including Fe-24Ni-20.5Cr-6.2Mo, Fe—Ni(32.5-35)-Cr(19-21)-Cu(3-4)-Mo(2-3)-Mn(<2)-Si(<1).

As described herein, the presintered metal or alloy of the coating inner layer, in some embodiments, is fully dense or substantially fully dense prior to application and/or formation of the outer layer of the coating. Alternatively, in some embodiments, the presintered metal or alloy of the inner layer has porosity. The porosity of the presintered metal or alloy, in some embodiments, is less than about 40% by volume. In some embodiments, the porosity of the presintered metal or alloy of the inner layer is less than about 30% by volume. In some embodiments, the porosity of the presintered metal or alloy of the inner layer is less than about 20% by volume. The porosity of the presintered metal or alloy, in some embodiments, is less than about 10% by volume. In some embodiments, the porosity of the presintered metal or alloy of the inner layer is less than about 5% by volume. In some embodiments, the porosity of the presintered metal or alloy of the inner layer is substantially uniform. In some embodiments, the porosity of the presintered metal or alloy of the inner layer is interconnected.

As discussed further herein, the porosity of a presintered metal or alloy of the inner layer, in some embodiments, is penetrated by the brazing metal or alloy matrix of the outer layer. In some embodiments, the porosity of the presintered metal or alloy of the inner layer is permeated or infiltrated with the brazing metal or alloy matrix of the outer layer to provide a fully dense or substantially fully dense inner layer.

In some embodiments of a composite article described herein, the inner layer of the coating further comprises particles disposed in the presintered metal or alloy. In such embodiments, the presintered metal or alloy acts as a matrix for the particles. Particles suitable for use with the metal or alloy matrix of the inner layer can comprise hard particles including, but not limited to, particles of metal carbides, metal nitrides, metal borides, metal silicides, ceramics, cemented carbides or cast carbides or mixtures thereof. Hard particles described herein can comprise precipitates and/or additive particles.

In some embodiments, hard particles comprise carbides of tungsten, titanium, chromium, molybdenum, zirconium, hafnium, tanatalum, niobium, rhenium, vanadium, iron, boron or silicon or mixtures thereof. Hard particles, in some embodiments, comprise nitrides of aluminum, boron, silicon, titanium, zirconium, hafnium, tantalum or niobium or mixtures thereof. Additionally, in some embodiments, hard particles comprise borides such as titanium di-boride and tantalum borides or silicides such as $MoSi_2$. Hard particles, in some embodiments, comprise crushed cemented carbide, crushed carbide, crushed nitride, crushed boride or crushed silicide or combinations thereof. In some embodiments, hard particles comprise intermetallic compounds such as nickel aluminide.

Hard particles can be present in the presintered metal or alloy matrix of a coating inner layer in any amount not inconsistent with the objectives of the present invention. In some embodiments, hard particles are present in the metal or alloy matrix in an amount less than about 20 volume percent. In some embodiments, hard particles are present in the metal or alloy matrix in an amount less than about 10 volume percent. Hard particles, in some embodiments, are present in an amount less than about 5 volume percent.

The inner layer of the coating having a construction described herein can have any thickness not inconsistent with the objectives of the present invention. In some embodiments, the inner layer has a thickness of at least about 100 μm. In some embodiments, the inner layer has a thickness ranging from about 200 μm to about 5 mm. The inner layer, in some embodiments, has a thickness ranging from about 500 μm to about 2 mm. In some embodiments, the inner layer has a thickness ranging from about 500 μm to about 1 mm. In some embodiments, the inner layer has a thickness ranging from about 200 μm to about 1 mm. In some embodiments, the inner layer has a thickness ranging from about 300 μm to about 800 μm.

In some embodiments, the inner layer of the coating having a construction described herein is metallurgically bonded to the substrate. Moreover, in some embodiments, the inner layer of the coating having a construction described herein has a hardness according to the Rockwell C scale (HRC) of less than about 40. In some embodiments, the inner layer of the coating has a hardness less than about 36 HRC. In some embodiments, the inner layer of the coating has a hardness less than about 30 HRC. In embodiments, wherein hard particles are present in the presintered metal or alloy, the foregoing HRC values are determined from the metal or alloy. HRC values recited herein are determined according to ASTM E18-08b Standard Test Method for Rockwell Hardness of Metallic Materials.

The inner layer of the coating, in some embodiments, has a substantially uniform finish prior to application or deposition of the outer layer. In some embodiments, for example, the inner layer has a surface roughness ($Ra_{\mu inches}$) less than about 250 prior to deposition of the outer layer. In some embodiments, the inner layer has a surface roughness of less than about 200 Ra or less than about 100 Ra prior to deposition of the outer layer. The inner layer, in some embodiments, has a surface roughness ranging from about 20 Ra to about 250 Ra or from about 30 Ra to about 125 Ra prior to deposition of the outer layer. In some embodiments, the inner layer is provided the desired surface roughness prior to deposition of the outer layer by mechanical means such as grinding, sand/grit blasting or combinations thereof. Surface roughness values recited herein are determined according to ASTM D7125-05 Standard Test Method for Measurement of Surface Roughness of Abrasive Blast Cleaned Metal Surfaces Using a Portable Stylus Instrument.

The inner layer of a coating described herein, in some embodiments, functions as a crack arrest layer. In some embodiments, the inner layer functions as a corrosion resistant layer. Moreover, in some embodiments, the inner layer functions as a crack arrest layer and a corrosion resistant layer.

A coating of a composite article described herein also comprises an outer layer. In some embodiments, the coating outer layer functions as an abrasion resistant and/or erosion resistant layer. The outer layer of a coating described herein comprises particles disposed in a metal or alloy matrix. The metal or alloy matrix of the outer layer can be selected according various considerations including, but not limited to, the compositional identity of the metal or alloy of the inner layer, the compositional identity of the substrate and/or the compositional identity of the particles to be disposed in the metal or alloy matrix of the outer layer. In some embodiments, for example, the metal or alloy matrix of the outer layer has a melting point or solidus temperature lower than the metal or alloy inner layer, the substrate and/or the particles disposed in the metal or alloy matrix. The melting point of the metal or alloy matrix of the outer layer, in some embodiments, is at least 100° C. lower than the melting point of the metal or alloy inner layer. In some embodiments, the melting point of the metal or alloy matrix of the outer layer is at least 200° C. lower than the melting point of the metal or alloy inner layer.

In some embodiments, the metal or alloy matrix of the outer layer is a brazing metal or brazing alloy. Any brazing metal or alloy not inconsistent with the objectives of the present invention can be used as the matrix of the outer layer. In some embodiments, for example, the alloy matrix of the outer layer comprises nickel-based alloys having compositional parameters derived from Table II:

TABLE II

Outer Layer Ni-Based Alloy Matrix Compositional Parameters

| Element | Amount (wt. %) |
|---|---|
| Chromium | 3-28 |
| Boron | 0-6 |
| Silicon | 0-15 |
| Phosphorous | 0-12 |
| Iron | 0-6 |
| Carbon | 0-1 |
| Copper | 0-50 |
| Molybdenum | 0-5 |
| Niobium | 0-5 |
| Tantalum | 0-5 |
| Tungsten | 0-20 |
| Nickel | Balance |

In some embodiments, the alloy matrix of the outer layer is selected from the Ni-based alloys of Table III.

TABLE III

Outer Layer Ni-Based Alloy Matrix Compositional Parameters

| Ni-Based Alloy | Compositional Parameters (wt. %) |
|---|---|
| 1 | Ni—15% Cr—3% B—0.06% C |
| 2 | Ni—14% Cr—4.5% Si—4.5% Fe—3.0% B—C |
| 3 | Ni—4.5% Si—3.5% B—C |
| 4 | Ni—14% Cr—10% P—C |
| 5 | Ni—25% Cr—10% P |
| 6 | Ni—19% Cr—10.2% Si—C |
| 7 | Ni—22% Cr—6.5% Si—4.5% P |
| 8 | Ni—15% Cr—8% Si |
| 9 | Ni—17% Cr—9% Si—0.1% B |
| 10 | Ni—7.0% Cr—5.0% P—50% Cu |
| 11 | Ni—4.9% Cr—65% Cu—3.5% P |
| 12 | Ni—(13-15)% Cr—(2.75-3.5)% B—(4.5-5.0)% Si—(4.5-5.0)% Fe—(0.6-0.9)% C |
| 13 | Ni—(18.6-19.5)% Cr—(9.7-10.5)% Si |

The alloy matrix of the outer layer, in some embodiments, comprises copper-based alloys. Suitable copper-based alloys can comprise additive elements of nickel (0-50%), manganese (0-30%), zinc (0-45%), aluminum (0-10%), silicon (0-5%), iron (0-5%) as well as other elements including phosphorous, chromium, beryllium, titanium and/or lead. In some embodiments, the alloy matrix of the outer layer is selected from the Cu-based alloys of Table IV.

TABLE IV

Outer Layer Cu-Based Alloy Matrix Compositional Parameters

| Cu-Based Alloy | Compositional Parameters |
|---|---|
| 1 | Cu—25% Ni—25% Mn |
| 2 | Cu—20% Ni—20% Mn |
| 3 | Cu—10% Ni |
| 4 | Cu—(29-32)% Ni—(1.7-2.3)% Fe—(1.5-2.5)% Mn |
| 5 | Cu—(2.8-4.0)% Si—1.5% Mn—1.0% Zn—1.0% Sn—Fe—Pb |
| 6 | Cu—(7.0-8.5)Al—(11-14)% Mn—2-4)% Fe—(1.5-3.0)% Ni |

The alloy matrix of the outer layer, in some embodiments, comprises cobalt-based alloys. Suitable cobalt-based alloys can comprise additive elements of chromium, nickel, boron, silicon, tungsten, carbon, phosphorous as well as other elements. In one embodiment, a cobalt-based alloy of the outer layer has the compositional parameters of Co-17% Ni-19% Cr-4.0% W-8.0% Si-0.8% B-0.4% C.

As described herein, the outer layer of the coating comprises particles disposed in the metal or alloy matrix. Particles suitable for use in the metal or alloy matrix of the outer layer can comprise hard particles. Hard particles of the outer layer, in some embodiments, comprise particles of metal carbides, metal nitrides, metal carbonitrides, metal borides, metal silicides, cemented carbides, cast carbides or other ceramics or mixtures thereof. In some embodiments, metallic elements of hard particles of the outer layer comprise aluminum, boron and/or one or more metallic elements selected from the group consisting of metallic elements of Groups IVB, VB, and VIB of the Periodic Table. Groups of the Periodic Table described herein are identified according to the CAS designation. Hard particles, in some embodiments, comprise tungsten carbide, boron nitride or titanium nitride or mixtures thereof.

Hard particles of the outer layer can have any size not inconsistent with the objectives of the present invention. In some embodiments, hard particles of the outer layer have a size distribution ranging from about 0.1 µm to about 1 mm. Hard particles, in some embodiments, have a size distribution ranging from about 1 µm to about 500 µm. In some embodiments, hard particles have a size distribution ranging from about 10 µm to about 300 µm. In some embodiments, hard particles have a size distribution ranging from about 50 µm to about 150 µm. In some embodiments, hard particles have a size distribution ranging from 10 µm to 50 µm. Hard particles, in some embodiments, demonstrate bimodal or multi-modal size distributions.

Hard particles of the outer layer can have any desired shape or geometry. In some embodiments, hard particles have spherical or elliptical geometry. In some embodiments, hard particles have a polygonal geometry. In some embodiments, hard particles have irregular shapes, including shapes with sharp edges.

Hard particles can be present in the metal or alloy matrix of the outer layer in any amount not inconsistent with the objectives of the present invention. Hard particle loading of the outer layer can be varied according to several considerations including, but not limited to, the desired hardness, abrasion resistance and/or toughness of the outer layer. In some embodiments, hard particles are present in the metal or alloy matrix of the outer layer in an amount ranging from about 20 volume percent to about 90 volume percent. Hard particles, in some embodiments, are present in the outer layer in an amount ranging from about 30 volume percent to about 85 volume percent. In some embodiments, hard particles are present in the outer layer in an amount ranging from about 40 volume percent to about 70 volume percent.

In some embodiments, the outer layer can further comprise abrasion resistant ceramic tiles, metal matrix composite tiles, crushed cemented carbides or mixtures thereof in the metal or alloy matrix of the outer layer for increasing the abrasion resistance of the outer layer. Ceramic and/or metal matrix composite tiles and crushed cemented carbides, in some embodiments, have a size ranging from about 1 mm to about 50 mm in at least one dimension.

The outer layer of the coating can have any thickness not inconsistent with the objectives of the present invention. In some embodiments, outer layer thickness is selected according to several considerations, such as the desired abrasion/erosion characteristics and/or lifetime of the outer layer. In some embodiments, the outer layer has a thickness of at least about 100 µm or at least about 500 µm. In some embodiments, the outer layer has a thickness of at least about 750 µm or at least about 1 mm. The outer layer, in some embodiments, has a thickness ranging from about 100 µm to about 5 mm. In some embodiments, the outer layer has a thickness ranging from about 500 µm to about 2 mm.

The outer layer of the coating comprising particles disposed in a metal or alloy matrix, in some embodiments, is metallurgically bonded to the metal or alloy inner layer. As described herein, a presintered metal or alloy of the inner layer, in some embodiments, is fully dense or substantially fully dense prior to application or formation of the outer layer. In some embodiments wherein the presintered metal or alloy of the inner layer is fully dense or substantially fully dense, fabrication of the outer layer over the presintered inner layer produces an interfacial transition region between the outer layer and the inner layer. In some embodiments, for example, the braze metal or alloy matrix of the outer layer diffuses into a surface region of the fully dense presintered metal or alloy of the inner layer to establish the interfacial transition region. The interfacial transition region, in some embodiments, has a structure different from the outer layer and different from the inner layer. Additionally, the interfacial transition region, in some embodiments, has a thickness ranging from about 1 µm to about 200 µm or from about 5 µm to about 100 µm. In some embodiments, the interfacial transition region has a thickness ranging from about 10 µm to about 50 µm.

Figure 2:
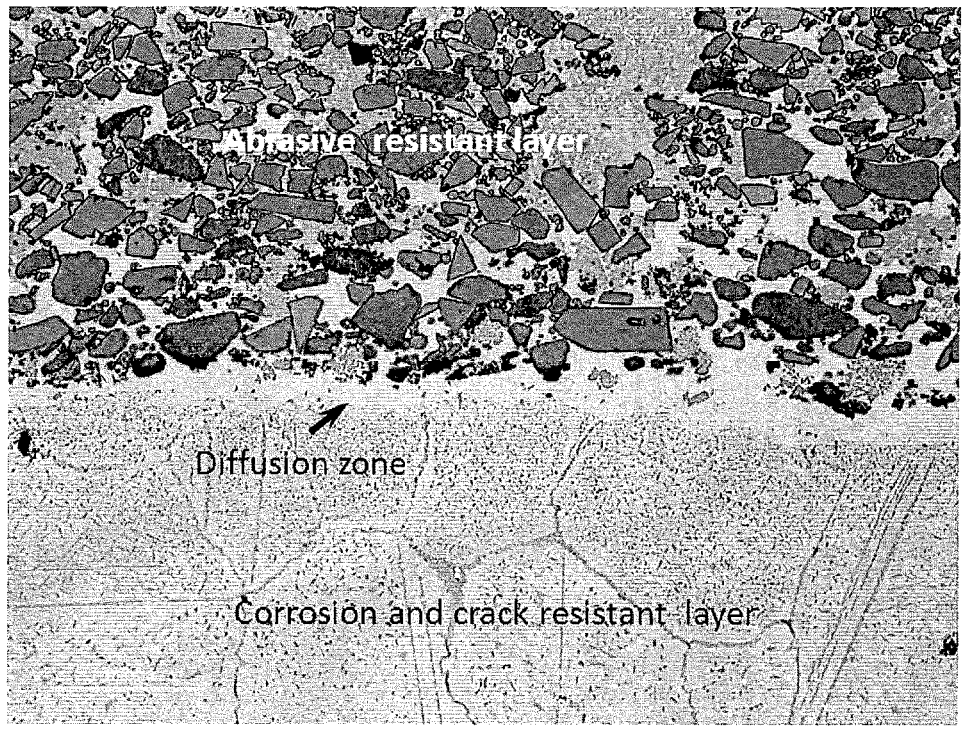
FIG. 2 illustrates a coating comprising an interfacial transition region according to one embodiment described herein.

FIG. 2 illustrates a coating comprising an interfacial transition region according to one embodiment described herein. The coating of FIG. 2 comprises a corrosion and crack resistant inner layer comprising a fully dense presintered alloy and an abrasion resistant outer layer comprising hard particles disposed in a metal or alloy matrix metallurgically bonded to the inner layer. An interfacial transition region is positioned between the abrasion resistant outer layer and the corrosion/crack resistant inner layer, the interfacial transition region having a structure different from the outer layer and the inner layer.

Alternatively, in some embodiments, a presintered metal or alloy of the inner layer has porosity prior to application or formation of the outer layer. The porosity of the presintered metal or alloy, in some embodiments, is penetrated by the metal or alloy matrix of the outer layer during formation or construction of the outer layer over the inner layer. In some embodiments, for example, the metal or alloy matrix of the outer layer permeates or infiltrates the porosity of the presintered metal or alloy to provide a fully dense or substantially fully dense inner layer.

The outer layer of a coating having a construction described herein, in some embodiments, has a hardness (HRC) greater than the inner layer of the coating. In some embodiments, the outer layer has a hardness of at least about 30 HRC. In some embodiments, the outer layer has a hardness of at least about 35 HRC. The outer layer, in some embodiments, has a hardness of at least about 40 HRC. In some embodiments, the outer layer has a hardness of at least about 45 HRC. In some embodiments, the outer layer has a hardness ranging from about 40 HRC to about 75 HRC.

Moreover, the outer layer of a coating having a construction described herein, in some embodiments, has an abrasion resistance greater than the inner layer and/or the substrate. Abrasion resistance recited herein is determined based on adjusted volume loss measured in accordance with Procedure A of ASTM G65 Standard Test Method for Measuring Abrasion Using the Dry Sand/Rubber Wheel. In some embodiments, the outer layer has an adjusted volume loss less than 0.02 $cm^3$ or less than about 0.012 $cm^3$. The outer layer, in some embodiments, has an adjusted volume loss less than 0.01 $cm^3$ or less than about 0.008 $cm^3$.

In some embodiments, a composite article described herein further comprises one or more layers of refractory material deposited over the outer layer by chemical vapor deposition (CVD), physical vapor deposition (PVD) or combinations thereof. CVD and/or PVD layer(s) deposited over the outer layer, in some embodiments, comprise ceramics, diamond, diamond-like carbon, tungsten carbide or combinations thereof. In some embodiments, the CVD and/or PVD layer(s) deposited over the outer layer comprise aluminum and/or one or more metallic elements selected from the group consisting of metallic elements of Groups IVB, VB and VIB of the Periodic Table and one or more non-metallic elements selected form the group consisting of non-metallic elements of Groups IIIA, IVA, and VIA of the Periodic Table. In some embodiments, the refractory layer(s) are deposited over the outer layer by low temperature or medium temperature CVD.

In another aspect, a composite article described herein comprises a substrate and a coating adhered to the substrate, the coating comprising an inner layer, an outer layer and an interfacial transition region between the inner layer and the outer layer, the inner layer comprising a fully dense or substantially fully dense metal or alloy, and the outer layer comprising particles disposed in a metal or alloy matrix.

In some embodiments, the fully dense or substantially fully dense metal or alloy of the inner layer displays a structure or construction consistent with being deposited by one of weld overlay, plasma transferred arc, thermal spray, cold spray, laser cladding, infrared cladding, induction cladding or other cladding technologies. Deposition of the metal or alloy of the inner layer by weld overlay, plasma transferred arc, thermal spray, cold spray, laser cladding, infrared cladding, induction cladding or other cladding technologies provides the inner layer a structure divergent from the foregoing embodiments wherein the metal or alloy of the inner layer is presintered. The outer layer of the coating comprising particles disposed in a metal alloy or matrix, however, can have any construction consistent with that recited hereinabove for the outer layer.

The interfacial transition region between the inner layer and the outer layer, in some embodiments, has a structure different from the inner layer and different from the outer layer. Additionally, the interfacial transition region, in some embodiments, has a thickness ranging from about 1 µm to about 150 µm. In some embodiments, the interfacial transition region between the inner layer and the outer layer has a thickness ranging from about 5 µm to about 100 µm. In some embodiments, the interfacial transition region has a thickness ranging from about 10 µm to about 50 µm.

In another aspect, methods of making a composite article are described herein. In some embodiments, a method of making a composite article comprises disposing over a surface of a substrate a sheet comprising a powder metal or powder alloy composition, heating the sheet to provide an inner layer comprising a sintered metal or sintered alloy adhered to the substrate. A particulate composition comprising hard particles in a carrier is disposed over the sintered metal or sintered alloy of the inner layer and a brazing alloy composition is disposed over the particulate composition. The particulate composition and the brazing alloy composition are heated to provide an outer layer comprising the hard particles disposed in an alloy matrix. In some embodiments, the outer layer is adhered to the inner layer.

Turning now to steps of methods described herein, a method described herein comprises disposing over the surface of a substrate a sheet comprising a powder metal or powder alloy composition. In some embodiments, the sheet comprising the powder metal or powder alloy composition is cloth-like in nature. The sheet, in some embodiments, comprises an organic material. In some embodiments, the sheet comprises one or more polymeric materials. Suitable polymeric materials for use in the sheet, in some embodiments, comprise one or more fluoropolymers including, but not limited to, polytetrafluoroethylene (PTFE).

In some embodiments, the desired powder metal or powder alloy composition of the coating inner layer of the composite article is selected and combined with an organic material, such as a polymeric powder, for the formation of the sheet. Any metal or alloy composition recited herein for the inner layer can be combined or blended with an organic material for the formation of the sheet. In some embodiments, for example, a powder alloy having compositional parameters selected from Table I herein is combined with an organic material. The organic material and the powder metal or powder alloy composition are mechanically worked or processed to trap the metal or alloy powder in the organic material. In one embodiment, for example, the desired powdered metal or powder alloy composition is mixed with 3-10% PTFE in volume and mechanically worked to fibrillate the PTFE and trap the powder metal or powder alloy. Mechanical working can include rolling, ball milling, stretching, elongating, spreading or combinations thereof. In some embodiments, the sheet comprising the powder metal or powder alloy is subjected to cold isostatic pressing. In some embodiments, the resulting sheet comprising the powder metal or powder alloy has a low elastic modulus and high green strength. In some embodiments, a sheet comprising a powder metal or powder alloy composition of the inner layer is produced in accordance with the disclosure of one or more of U.S. Pat. Nos. 3,743,556, 3,864,124, 3,916,506, 4,194,040 and 5,352,526, each of which is incorporated herein by reference in its entirety.

Alternatively, the desired powder metal or powder alloy composition is combined with a liquid carrier for application to the substrate. In some embodiments, for example, the powder metal or powder alloy is disposed in a liquid carrier to provide a slurry or paint for application to the substrate. Suitable liquid carriers for powder metal or powder alloy compositions described herein comprise several components including dispersion agents, thickening agents, adhesion agents, surface tension reduction agents and/or foam reduction agents. In some embodiments, suitable liquid carriers are aqueous based.

Powder metal or powder alloy compositions disposed in a liquid carrier can be applied to surfaces of the substrate by several techniques including, but not limited to, spraying, brushing, flow coating, dipping and/or related techniques. The powder metal or powder alloy composition can be applied to the substrate surface in a single application or multiple applications depending on desired thickness of the coating inner layer.

Moreover, in some embodiments, powder metal or powder alloy compositions disposed in liquid carriers can be prepared and applied to substrate surfaces in accordance with the disclosure of U.S. Pat. No. 6,649,682 which is hereby incorporated by reference in its entirety.

After being disposed over a surface of the substrate, the sheet or liquid carrier comprising the powder metal or powder alloy is heated to provide the inner layer of the coating comprising the sintered metal or sintered alloy adhered to the substrate. The sheet or liquid carrier is decomposed or burned off during the heating process. The sintered metal or sintered alloy resulting from the heating process can have any property or combination of properties recited herein for a sintered metal or sintered alloy of the inner layer. In some embodiments, the substrate and sheet or liquid carrier comprising the powder metal or powder alloy composition is heated in a vacuum, inert or reducing atmosphere at a temperature and for a time period where the integrity of the substrate is maintained and the powder metal or powder alloy is densified to the desired amount. As known to one of skill in the art, heating conditions including temperatures, atmosphere and time are dependent on several considerations including the identity of the substrate, the identity of the powder metal or powder alloy and the desired structure of the resulting sintered layer.

In some embodiments, the powder metal or powder alloy is heated under conditions sufficient to produce a fully dense or substantially fully dense sintered metal or sintered alloy inner layer. Alternatively, the powder metal or powder alloy composition, in some embodiments, is heated under conditions sufficient to produce a sintered metal or sintered alloy inner layer having a desired porosity. In some embodiments, for example, the powder metal or powder alloy composition is heated under conditions to produce a sintered metal or sintered alloy having porosity as recited herein. In some embodiments, the powder metal or powder alloy composition is subjected to hot isostatic pressing and/or other mechanical processing to achieve the desired densification.

Figure 3:
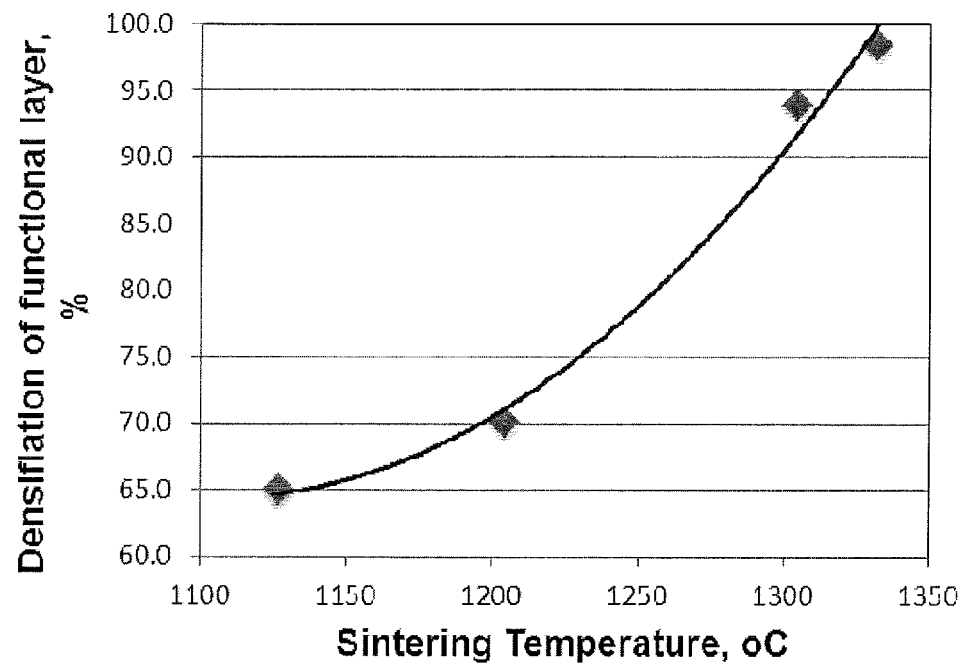
FIG. 3 illustrates densification of a powder alloy of a coating inner layer as a function of heating or sintering temperature according to one embodiment described herein.

FIG. 3 illustrates densification of a powder alloy of the inner layer as a function of heating or sintering temperature according to one embodiment described herein. The powder alloy used to generate the curve in FIG. 3 had compositional parameters of 20-23% chromium, 8-10% molybdenum, up to 5% iron, 3.15-4.15% total of niobium and tantalum, and balance nickel. Curves similar to the one illustrated in FIG. 3 can be used in the selection of heating or sintering conditions for powder metal or powder alloy compositions to provide a sintered metal or sintered alloy inner layer having the desired densification.

In some embodiments, heating the substrate and powder metal or powder alloy composition metallurgically binds the resulting sintered metal or sintered alloy of the inner layer to the substrate. Additionally, in some embodiments, the substrate is cleaned prior to application of the sheet or liquid carrier comprising the powder metal or powder alloy composition. Cleaning the substrate can be administered by chemical treatment, mechanical treatment or both. In some embodiments, for example, a substrate is cleaned with sodium hydroxide solution and/or subjected to grit or particle blasting.

An outer layer of the coating is subsequently applied over the inner layer. A particulate composition in a carrier is subsequently disposed over the sintered metal or sintered alloy of the inner layer and a brazing alloy composition is disposed over the particulate composition. In some embodiments, the particulate composition comprises hard particles. Suitable hard particles can comprise any of the hard particles recited herein. In some embodiments, for example, hard particles of the particulate composition comprise particles of metal carbides, metal nitrides, metal borides, metal silicides, cemented carbides, cast carbides or other ceramics or mixtures thereof.

A suitable carrier for the particulate composition, in some embodiments, comprises a sheet as described hereinabove for the powder metal or powder alloy of the inner layer. In one embodiment, for example, an abrasive hard particulate composition comprising 94 volume percent crushed cemented carbide particles, tungsten carbide particles or titanium carbide particles or combinations thereof is mixed with 6% PTFE in volume, followed by mechanical working to provide the sheet.

Alternatively, in some embodiments, a suitable carrier for the particulate composition comprising hard particles is a liquid carrier as described herein for the powder metal or powder alloy of the inner layer. In some embodiments, for example, hard particles disposed in a liquid carrier are applied to the sintered metal or sintered alloy of the inner layer by one or more of spraying, brushing, flow coating, dipping and/or related techniques. In some embodiments, hard particles disposed in a liquid carrier can be prepared and applied in accordance with the disclosure of U.S. Pat. No. 6,649,682.

The brazing alloy composition disposed over the particulate composition of hard particles, in some embodiments, comprises a brazing alloy described herein. In some embodiments, for example, the brazing alloy composition is selected from Table II, Table III or Table IV herein. In some embodiments, the brazing alloy composition is provided as a braze alloy powder disposed in a sheet as described hereinabove for the powder metal or powder alloy of the coating inner layer. In some embodiments, the brazing alloy composition is provided as a thin sheet of the brazing alloy composition itself.

The particulate composition comprising hard particles and the brazing alloy composition are heated to provide an outer layer of the composite article comprising the hard particles disposed in a brazing alloy matrix. The outer layer resulting from the heating process can have any property or combination of properties recited herein for an outer layer. As the brazing alloy composition has a melting point lower than the melting point of the sintered metal or sintered alloy of the inner layer, the brazing alloy and particulate composition are heated to a temperature below the melting point of the sintered metal or sintered alloy of the inner layer. In some embodiments, the brazing alloy and particulate composition are heated to a temperature at least 100° C. below the melting point of the sintered metal or sintered alloy of the inner layer.

In some embodiments, the outer layer comprising hard particles disposed in the braze alloy matrix is metallurgically bonded to the sintered metal or sintered alloy of the inner layer. Moreover, in some embodiments wherein the sintered metal or sintered alloy of the inner layer has porosity prior to application of the outer layer, the braze alloy of the outer layer penetrates the porosity. In some embodiments, for example, the braze alloy of the outer layer permeates or infiltrates porosity of the sintered metal or sintered alloy to provide a fully dense or substantially fully dense inner layer.

In some embodiments of methods described herein, the sintered metal or sintered alloy of the inner layer is processed to provide a desired surface roughness of the metal or alloy prior to application or deposition of the outer layer. The sintered metal or alloy of the inner layer, in some embodiments, is processed to provide a surface roughness ($Ra_{\mu inches}$) less than about 250 Ra. In some embodiments, the sintered metal or alloy of the inner layer is processed to provide a surface roughness less than about 200 Ra or less than about 100 Ra. The sintered metal or alloy of the inner layer, in some embodiments, is processed to provide a surface roughness ranging from about 20 Ra to about 250 Ra or from about 30 Ra to about 125 Ra. The sintered metal or sintered alloy of the inner layer can be processed according to a variety of techniques including mechanical means, such as grinding, sand/grit blasting or combinations thereof.

In some embodiments of methods described herein, the metal or alloy inner layer is deposited by one of weld overlay, plasma transferred arc, thermal spray, cold spray, laser cladding, infrared cladding, induction cladding or other cladding technologies. As further illustrated in the examples to follow, deposition of the metal or alloy of the inner layer by weld overlay, plasma transferred arc, thermal spray, cold spray, laser cladding, infrared cladding, induction cladding or other cladding technologies provides the inner layer a structure divergent from the foregoing embodiments wherein the metal or alloy of the inner layer is sintered.

Additionally, in some embodiments wherein the metal or alloy inner layer is deposited by weld overlay, plasma transferred arc, thermal spray, cold spray, laser cladding, infrared cladding, induction cladding or other cladding technologies, the outer layer is applied or deposited according to procedures set forth herein.

These and other embodiments are further illustrated by the following non-limiting examples.

Example 1

Composite Article Comprising Functionally Graded Coating

A composite article having a construction described herein was produced as follows. Tungsten carbide powder (40% by volume 2 to 5 microns size particles and 60% by volume-325 mesh size particles) was mixed with 6% by volume of PTFE. The mixture was mechanically worked to fibrillate PTFE and trap the tungsten carbide particles and then rolled, thus making a cloth-like flexible abrasive carbide sheet as fully described in U.S. Pat. No. 4,194,040. A braze metal filler powder with composition of 79-84% nickel, 13-19% chromium and 2-5% boron by weight was mixed with 6% by volume of PTFE to form a cloth-like braze sheet, similar to that of tungsten carbide sheet set forth above.

A corrosion and crack resistant alloy powder with a composition of 20-23% chromium, 8-10% molybdenum, up to 5% iron, 3.15-4.15% total of niobium and tantalum, and the balance nickel by weight was mixed with 6% by volume of PTFE to form a cloth-like corrosion and crack resistant alloy sheet, in the way similar to that of tungsten carbide sheet set forth above.

Figure 4:
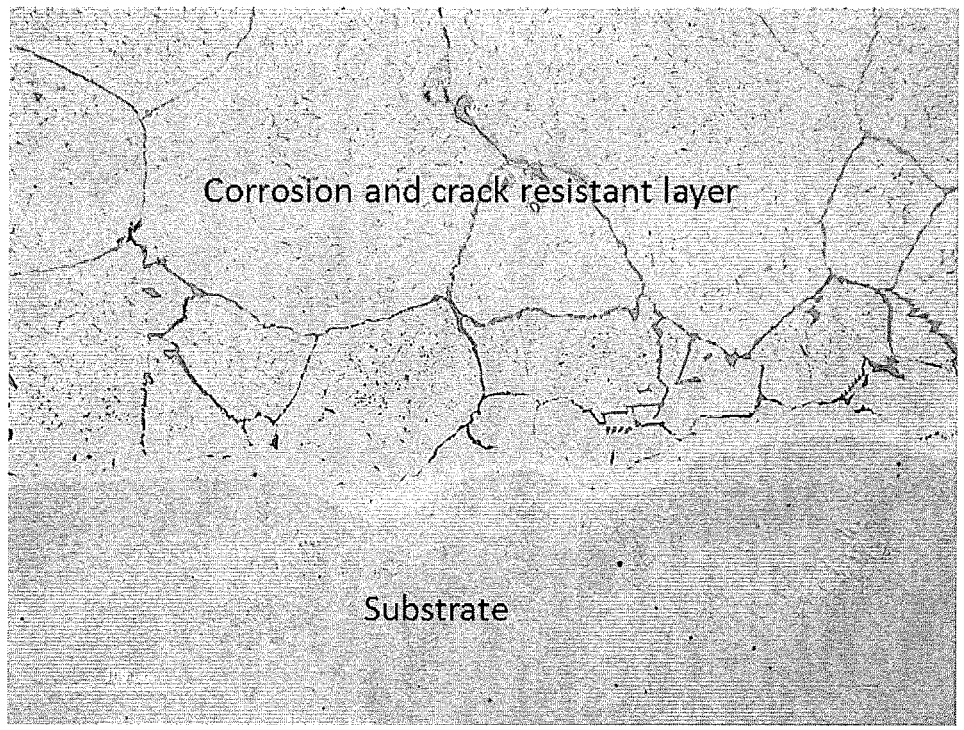
FIG. 4 is a cross-section metallography of a sintered continuous alloy of a coating inner layer metallurgically bonded to a substrate according to one embodiment described herein.

The cloth-like corrosion and crack resistant alloy sheet was applied to the outer diameter (OD) surface of a 4140 steel tube substrate by means of adhesive in preparation for the formation of an inner layer of the coating. The sample was heated in a vacuum furnace to 1330° C., and held at this temperature for approximately 60 minutes, during which the alloy powder was densified into an essentially porosity-free sintered continuous alloy inner layer, metallurgically bonded to the substrate steel upon cooling. FIG. 4 is a cross-section metallography of the sintered continuous alloy inner layer illustrating the porosity-free nature of the sintered alloy and the metallurgical bonding of the sintered alloy inner layer to the substrate. After cooling, the surface of the sintered alloy was mechanically worked to a finish for applying the abrasive resistant layer.

The tungsten carbide sheet preform was applied on the corrosion and crack resistant alloy surface of the inner layer by means of adhesive and a braze filler sheet preform was glued in place over the tungsten carbide sheet preform. The sample was then heated in a vacuum furnace to 1100° C.-1160° C. for approximately 15 minutes to 4 hours during which the braze preform melted and infiltrated the tungsten carbide preform, and upon cooling, a functionally graded coating/cladding was formed comprising a tungsten carbide abrasive outer layer metallurgically bonded to the corrosion and crack resistant sintered alloy inner layer.

The resulting composite article comprising the functionally graded coating/cladding was heat-treated by heating to 800° C.-950° C. in a salt bath, held for 1-4 hours, followed by quenching in a molten salt bath to 150° C.-250° C. The composite article was then tempered at 550° C.-750° C. in air for 3 hours. The hardness of steel substrate after heat treatment was about 32 HRC. Visual examination of the coating/cladding surface indicated a significant reduction in visible cracks at the surface of the abrasive carbide outer layer compared with prior art coatings formed without a sintered alloy inner layer, such as those demonstrated in one or more or U.S. Pat. Nos. 3,743,556, 3,864,124, 3,916,506, 4,194,040, 5,236,116, 5,164,247, and 5,352,526.

Figure 5:
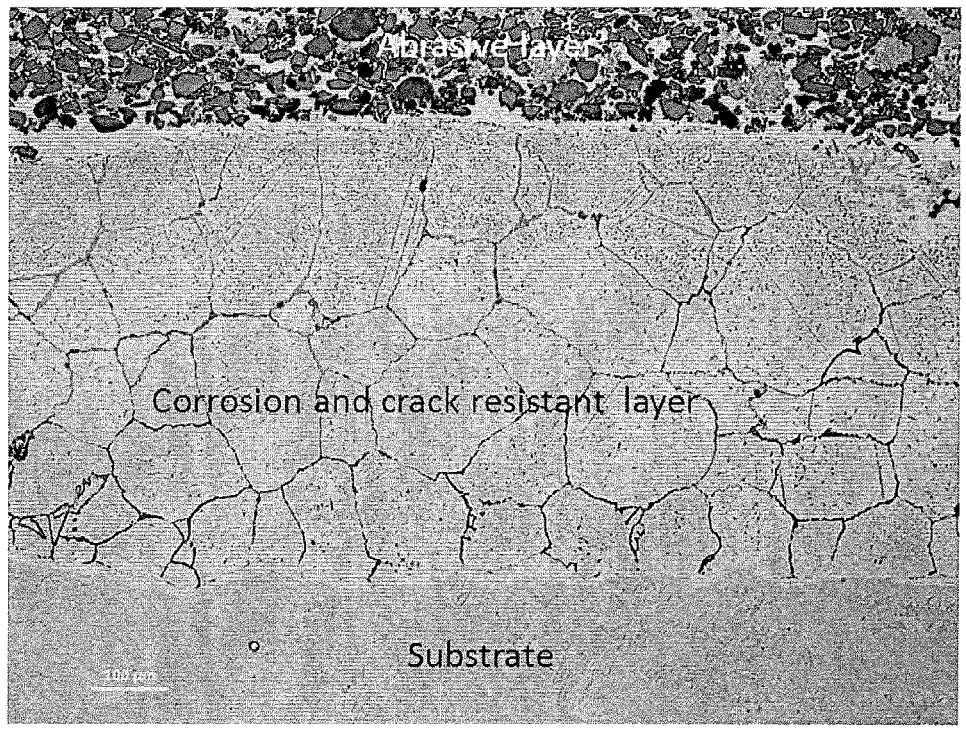
FIG. 5 is a cross-section metallography of a composite article according to one embodiment described herein.

Furthermore, metallographic examination of the cross section of the coating/cladding of the present example, as illustrated in FIG. 5, indicated the absence of cracks penetrating into sintered alloy corrosion resistant/crack arresting inner layer. The cross section metallography also indicated metallurgical bonding at the interfaces among outer abrasive layer, inner corrosion/crack resistant layer, and substrate.

Example 2

Composite Article Comprising Functionally Graded Coating

A composite article having a construction described herein was produced in accordance with the procedure of Example 1, the difference being that the corrosion and crack resistant alloy of the inner layer was heated to a temperature of 1300° C. and held for 60 minutes in the vacuum furnace for densification and metallurgical bonding to the steel substrate surface. The resulting sintered alloy of the inner layer demonstrated porosity ranging from 3-7% in volume.

Figure 6:
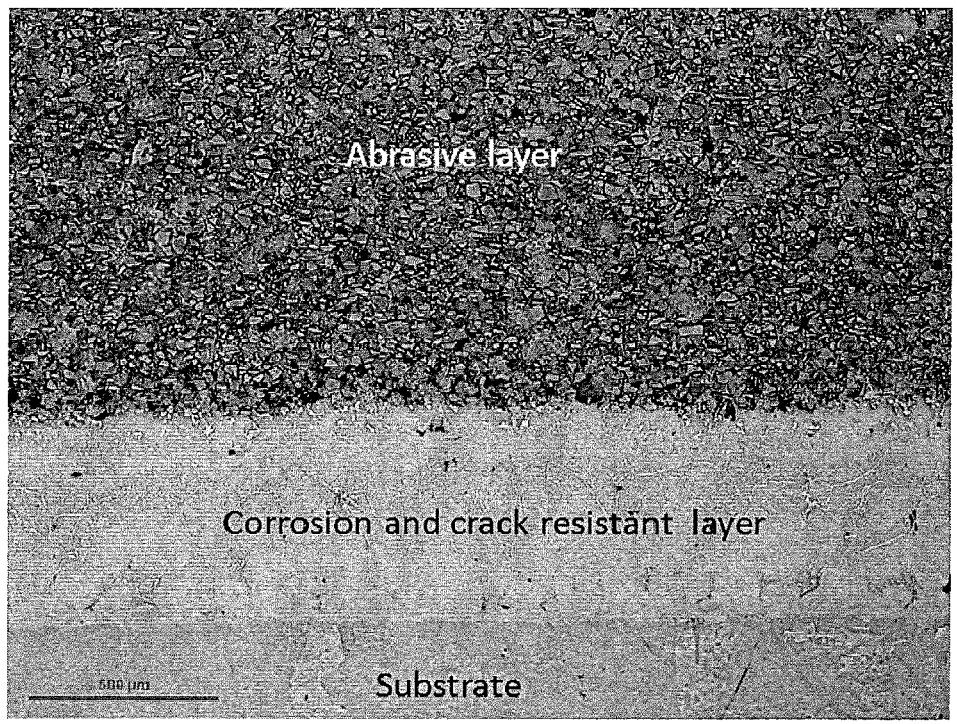
FIG. 6 is a cross-section metallography of a composite article according to one embodiment described herein.

As in Example 1, the tungsten carbide sheet preform was then applied to the sintered alloy surface by means of adhesive, and the braze filler sheet preform was glued in place over the tungsten carbide preform, followed by heating in a vacuum furnace to 1100° C.-1160° C. for approximately 15 minutes to 4 hours. The braze preform thus melted and infiltrated the inner alloy layer, as well as the carbide preform Infiltration of the sintered alloy of the inner layer by the braze alloy reduced the porosity of the sintered alloy to provide a fully dense or substantially fully dense inner layer. As the result, the inner alloy layer was bonded metallurgically to both the outer abrasive carbide layer and the underneath steel substrate. While displaying a different microstructure from that formed in Example 1 (as shown in FIG. 4), the continuous, essentially porosity-free inner alloy layer was also crack resistant during a heat treatment administered as described in Example 1. FIG. 6 is a cross-section metallography of the composite article of the present example illustrating the absence of cracks penetrating into the sintered alloy corrosion resistant/crack arresting inner layer after heat treatment of the composite article.

Example 3

Composite Article Comprising Functionally Graded Coating

Figure 7:
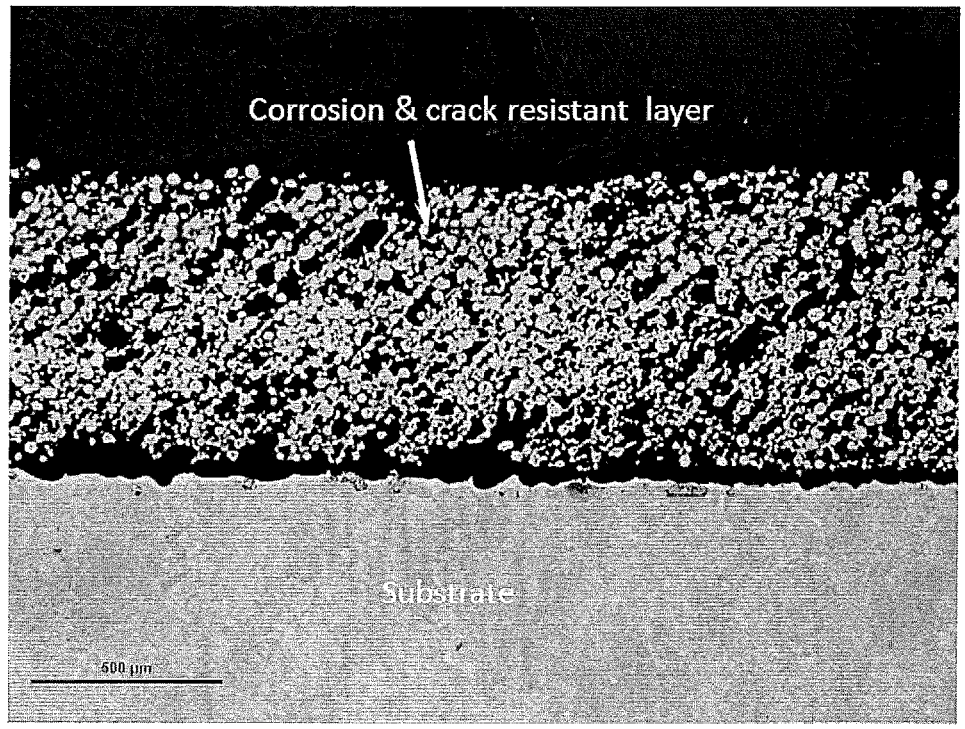
FIG. 7 is a cross-section metallography of a porous sintered alloy of a coating inner layer according to one embodiment described herein.

A composite article having a construction described herein was produced in accordance with the procedure of Example 1, the difference being that the corrosion and crack resistant alloy of the inner layer was heated to a temperature of 1200° C. and held for 60 minutes in the vacuum furnace. The resulting sintered alloy of the inner layer demonstrated a higher porosity ranging from 28-34% in volume. The sintered alloy inner layer bonded to the steel substrate as displayed in FIG. 7. FIG. 7 additionally illustrates the porosity of the sintered alloy.

Figure 8:
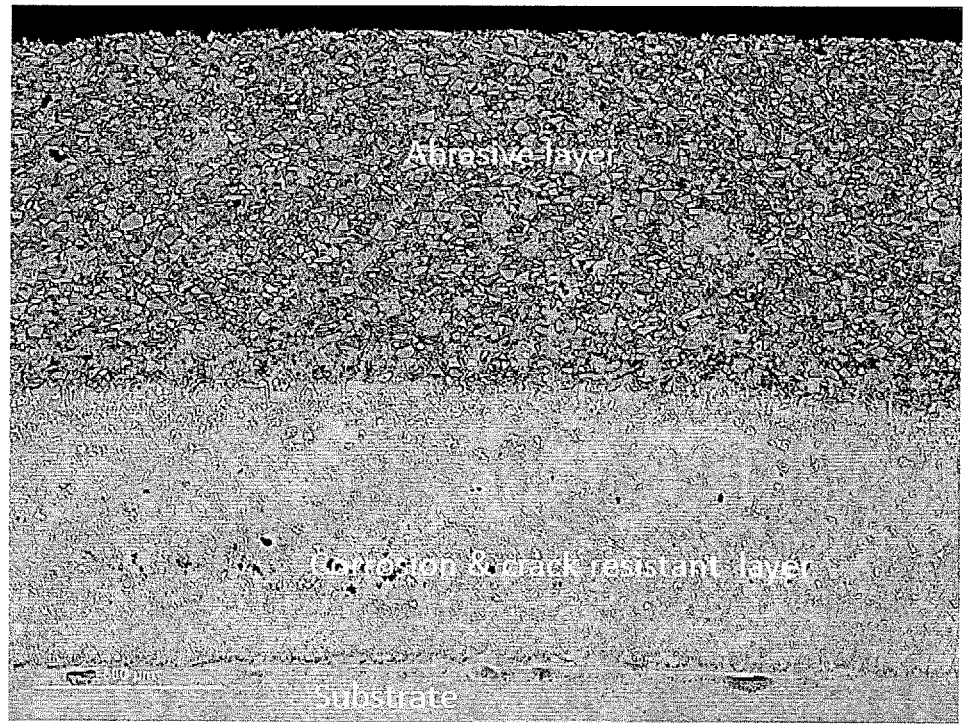
FIG. 8 is a cross-section metallography of the sintered alloy of FIG. 7 after application of an abrasive outer layer to the sintered alloy according to one embodiment described herein.

The tungsten carbide abrasive outer layer was deposited on the porous sintered alloy of the inner corrosion and crack resistant inner layer in accordance with the process of Example 1. The braze alloy preform thus melted and infiltrated the inner alloy layer, as well as the carbide preform. Infiltration of the sintered alloy of the inner layer by the braze alloy reduced the porosity of the sintered alloy to provide a fully dense or substantially fully dense inner layer. As the result the inner alloy layer was bonded metallurgically to both the outer abrasive carbide layer and the underneath steel substrate. FIG. 8 is a cross-section metallography of the composite article of the present example illustrating the abrasive carbide outer layer and the fully dense or substantially fully dense alloy of the corrosion/crack resistant inner layer produced by infiltration of the porous sintered alloy by the braze of the outer layer.

The functionally graded coating of the present example was less crack resistant in comparison with Examples 1 and 2 during heat treatment. After a heat treatment was administered in accordance with Example 1, several cracks originated from the outer abrasive layer and were terminated at the interface with the inner crack and corrosion resistant alloy layer. While demonstrating less crack resistance, the functionally graded coating of the present example was an enhancement over prior coatings.

Example 4

Composite Article Comprising Functionally Graded Coating

Figure 9:
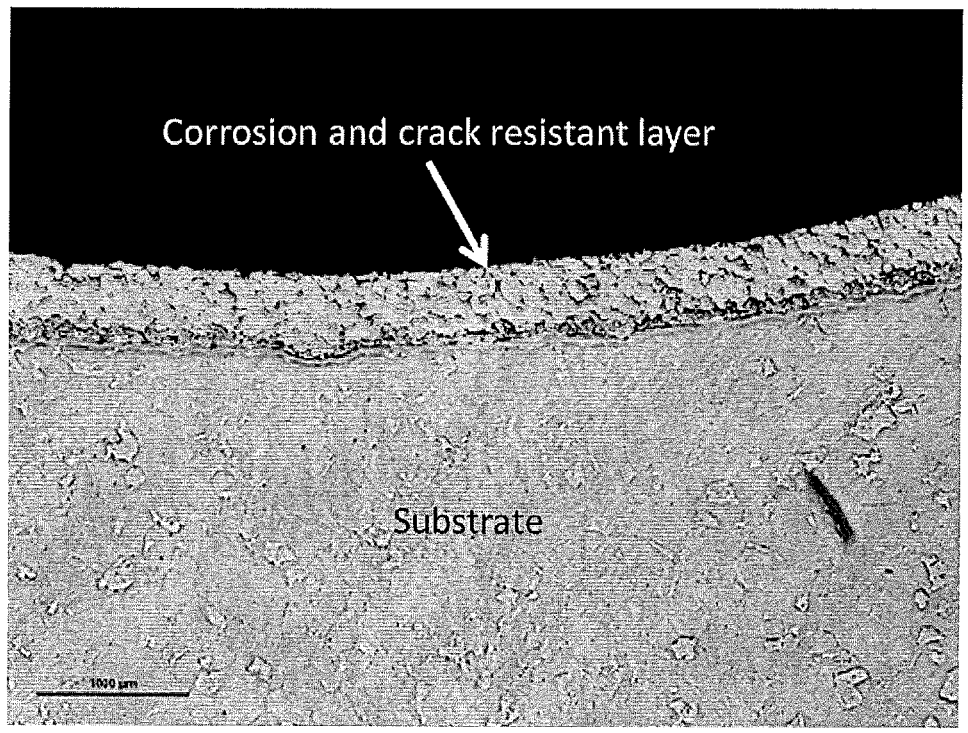
FIG. 9 is a cross-section metallography of a sintered alloy of an inner corrosion resistant and crack arrest layer of a composite article according to one embodiment described herein.

A composite article having a construction described herein was produced in accordance with Example 1, the difference being that the inner diameter (ID) of the steel substrate tube was coated. Cross section metallography of the functionally graded coating/cladding on the ID after heat treatment provided evidence of the same microstructure as the coating on the OD in Example 1. Moreover, cracks did not penetrate into corrosion/crack resistant inner layer. FIG. 9 displays a cross-section metallography of the sintered alloy of the inner corrosion resistant and crack arrest layer.

Example 5

Composite Article Comprising Functionally Graded Coating

Figure 10:
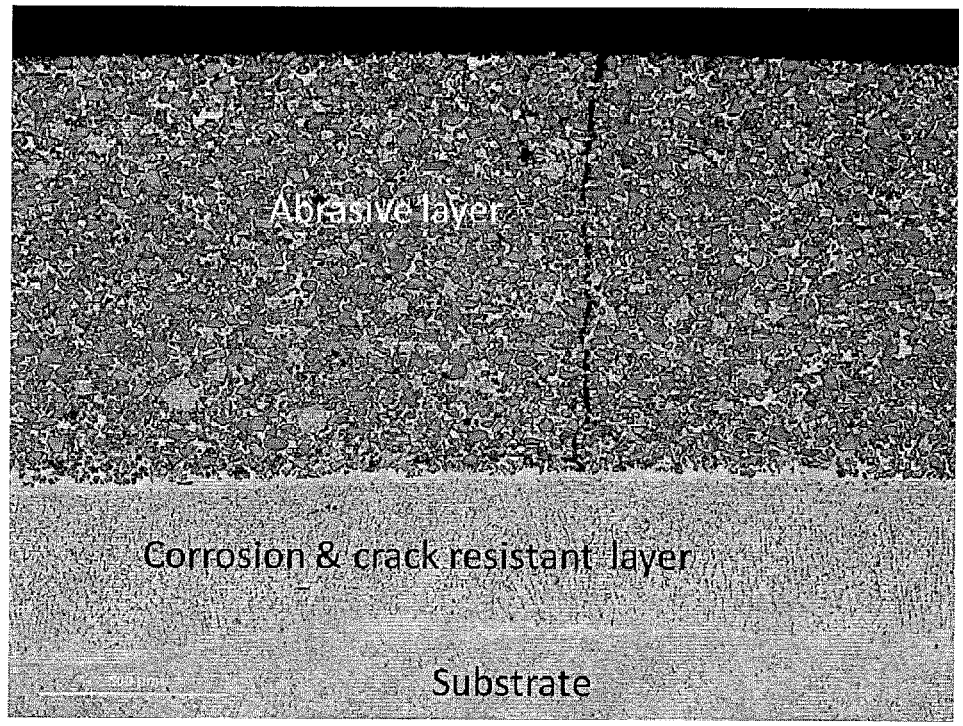
FIG. 10 is a cross-section metallography of a composite article according to one embodiment described herein.

As described herein, a continuous corrosion and crack resistant inner layer of a composite article may also be produced by laser cladding, plasma transferred arc, weld overlay and other techniques before adding an outer abrasive layer by clothing. In the present example, a corrosion and crack resistant layer of about 750 nm thick was deposited on a 4140 steel substrate surface by plasma transferred arc using −325/+120 meshes of alloy powder of the same composition as that used in Example 1 (alloy wire of the same composition may also be used). The surface of the resulting alloy layer was ground and sand-blasted, followed by adding an abrasive carbide outer layer in accordance with the process described in Example 1. FIG. 10 displays the cross section metallography after heat treating the composite article of the present example as described in Example 1. The inner alloy layer was fully dense or substantially fully dense and free of cracks.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A composite article comprising:
a substrate; and
a coating adhered to the substrate, the coating comprising an inner layer and an outer layer, the inner layer comprising a presintered metal or alloy layer having porosity less than 40% by volume and the outer layer comprising particles and tiles disposed in a metal or alloy matrix, wherein the tiles are metal carbide tiles or ceramic tiles.

2. The composite article of claim 1, wherein the metal or alloy layer is substantially fully dense.

3. The composite article of claim 1, wherein the porosity of the metal or alloy layer is infiltrated with the metal or alloy matrix of the outer layer to provide a substantially fully dense inner layer.

4. The composite article of claim 1, wherein the inner layer is metallurgically bonded to the substrate.

5. The composite article of claim 2, further comprising an interfacial transition region between the inner layer and the outer layer.

6. The composite article of claim 5, wherein the interfacial transition region has a thickness ranging from about 1 μm to about 150 μm.

7. The composite article of claim 1, wherein the particles of the outer layer comprise one or more metal carbides, metal nitrides, metal borides, metal silicides, cemented carbides, cast carbides or mixtures thereof.

8. The composite article of claim 1, wherein the substrate comprises steel.

9. The composite article of claim 1, wherein the porosity is less than 10% by volume.

10. The composite article of claim 1, wherein the coating further comprises at least one layer of refractory material deposited over the outer layer by chemical vapor deposition or physical vapor deposition or a combination thereof.

11. A composite article comprising:
a substrate; and
a coating adhered to the substrate, the coating comprising an inner layer and an outer layer, the inner layer comprising a presintered metal or metal alloy and the outer layer comprising particles and tiles disposed in a metal or alloy matrix, wherein the tiles are metal carbide tiles or ceramic tiles.

12. The composite article of claim 11, wherein the presintered metal or alloy of the inner layer is substantially fully dense.

13. The composite article of claim 11, wherein the presintered metal or alloy of the inner layer comprises porosity penetrated by the metal or alloy matrix of the outer layer.

14. The composite article of claim 13, wherein the porosity of the presintered metal or alloy of the inner layer is less than 40% by volume.

15. The composite article of claim 13, wherein the porosity of the presintered metal or alloy of the inner layer is infiltrated with the metal or alloy matrix of the outer layer to provide a substantially fully dense inner layer.

16. The composite article of claim 11, wherein the inner layer is metallurgically bonded to the substrate.

17. The composite article of claim 11, wherein the particles of the outer layer comprise one or more metal carbides, metal nitrides, metal borides, metal silicides, ceramics, cemented carbides, cast carbides or mixtures thereof.

18. The composite article of claim 11, wherein the inner layer has hardness on the Rockwell C scale lower than the outer layer.

19. The composite article of claim 18, wherein the outer layer has an abrasion resistance greater than the inner layer as measured according to ASTM G65-04.

20. The composite article of claim 11, wherein the substrate comprises steel.

21. The composite of claim 11, wherein the inner layer further comprises particles disposed in the presintered metal or alloy, the particles selected from the group consisting of metal carbides, metal nitrides, metal borides, metal silicides, ceramics, cemented carbides and cast carbides and mixtures thereof.

22. The composite article of claim 11, wherein the coating further comprises at least one layer of refractory material deposited over the outer layer by chemical vapor deposition or physical vapor deposition of a combination thereof.

23. The composite article of claim 11, wherein the inner layer of the coating has corrosion resistant and crack arrest functionalities, and the outer layer of the coating has an abrasion resistant functionality, erosion resistant functionality or combination thereof.

* * * * *